United States Patent Office 3,382,150
Patented May 7, 1968

3,382,150
SPRAY-DRIED COATED ORGANOPOLYSILOXANE ORAL PHARMACEUTICAL OR VETERINARY COMPOSITION
George M. Grass, Jr., Phoenixville, and Donald R. MacDonnell, Radnor, Pa., assignors to Smith Kline & French Laboratories, Philadelphia, Pa., a corporation of Pennsylvania
No Drawing. Continuation-in-part of application Ser. No. 191,435, May 1, 1962. This application Sept. 23, 1965, Ser. No. 489,753
10 Claims. (Cl. 167—82)

ABSTRACT OF THE DISCLOSURE

Spray-dried coated organopolysiloxane compositions for pharmaceutical or veterinary use and dosage forms such as compressed tablets employing the coated silicones. These compositions are prepared by spray-drying an aqueous homogenous emulsion of an organopolysiloxane admixed with a nontoxic emulsifiable coating material.

This application is a continuation-in-part of application Ser. No. 191,435 filed May 1, 1962, now United States Patent 3,210,208.

This invention relates to a novel pharmaceutical dosage form and to powdered silicone employed in the preparation of said dosage forms. More specifically this invention relates to a novel pharmaceutical tablet containing powdered organopolysiloxanes.

Silicones, in particular organopolysiloxanes, have a wide variety of uses. For example, these compounds are used as releasing agents for mold releases or in the baking industry to give a quick and clean release from baking pans. The compounds are used in cosmetics, hand creams and sun tan lotions. Other industries such as chemical processing, petroleum, food processing and textile use silicone as an antifoaming agent.

More recently theropeutic uses have been revealed for the organopolysiloxanes. In veterinary practice these compounds are used for treating frothy bloat in ruminants and tympanic colic in horses. In humans the organopolysiloxanes are being used to treat gastrointestinal disturbances. However, due to the physical properties and oily nature of the silicones it has been very difficult to prepare an oral dosage form containing the same.

Prior to this invention the silicones were supplied either as an oil or an emulsion. More recently solid forms of silicones have been prepared by adsorbing them on silica gels or other adsorbing agents. However, none of these presently available forms of silicone are adaptable for the proper dispersion which is necessary to obtain the full effect of the silicone. Not only are the previously available forms of silicone very poorly dispersed in aqueous and solid systems but they are also very difficult to measure and handle.

One of the major disadvantages of the present commercially available forms of silicone is the difficulty encountered in the preparation of pharmaceutical oral dosage forms, particularly tablets. For example, the silicone being in an oily semisolid or viscous liquid form is very difficult to weigh in small amounts or to mix accurately with dry ingredients. When preparing a tablet with these oily silicones an absorbent material must be used. Further, the oily nature of the silicones contributes to a tablet granulation which is difficult to dry and due to the adhesive property of the silicone oil makes the flowability of the granulation from the hopper very poor if not sometimes impossible.

Most important, in order to insure proper dispersion of the silicone in the intestinal tract after the tablet has disintegrated a completely homogenous mixture of silicone and tablet carrier would be necessary. Practically each tablet particle must be coated with the silicone oil to insure this dispersion. This has been very difficult to accomplish in the silicone tableting art because the mixing of the oil and solids invariably presents unwanted "clumps" or clusters.

The powdered silicone compositions of this invention overcome the previous problems such as dispersion and handling of the silicone. The applicants by preparing powder form compositions have made the compounds much more adaptable to specific situations. For example, in veterinary practice silicones are given to the animals for the treatment of bloat either by injection into the rumen or if given orally must be given as a drench. The novel powdered silicone prepared by this invention needs only to be mixed with the feed of the animal curatively or prophylactically and is ingested without any difficulty. Other advantages of the powdered silicone when applied to the heretofore mentioned uses are obvious. Oily lotions and hand creams containing liquid silicones can be replaced by dry medicated silicone powders, molds need only be dusted with the powdered silicone and foaming processes only need to be simply sprinkled with a dry antifoam powder which can be easily handled by the use of a puffet package.

Most advantageously pharmaceutical tablets can now be prepared from a powdered silicone. The problems previously encountered when working with an oil and solid tablet filler or absorbent is eliminated. The tablet technician can now prepare a granulation by mixing all his ingredients in powdered form. The end result is an easily dried, free flowing granulation which presents no tableting problems. Finally, by mixing powdered silicone with the tablet filler a true homogenous dispersion of the silicone in the tablet is assured. This leads to a proper dispersion of the silicone in the intestinal tract after tablet disintegration has taken place.

It is therefore the principal object of this invention to provide an improved oral dosage form containing powdered organopolysiloxanes to be used for the treatment of gastrointestinal disturbances.

According to the present invention an emulsion comprising the organopolysiloxanes, a nontoxic coating material and water is prepared. The emulsion is then spray dried to form dry particles comprising the organopolysiloxane substantially completely coated with the coating material. The spray dried silicone powder is then tableted by itself or combined with a medicament, such as, for example, an antacid.

The organopolysiloxane will be in liquid form and will be present from about 5% to about 85% and preferably from about 20% to about 50% by weight of the total solids comprising the finished products. Advantageously the oily or semisolid organopolysiloxanes are represented by the general formula:

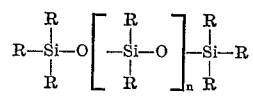

where R represents a lower alkyl group not exceeding 5 carbon atoms or an organic radical such as phenyl and $n$ can be from 0 to 2000. Most advantageously the siloxanes will be methylpolysiloxanes of at least 200 cs. viscosity at 25° C., preferably with a viscosity of between 250 and 1000 cs. at 25° C. Preferably the methylsiloxanes will contain from 1.9 to 2.1 methyl radicals per silicone atom.

The coating material will be present from about 15% to about 95% and preferably from about 50% to about 80% by weight of the total solids comprising the finished product. The coating material will be a cellulose ester, a natural gum, a gum constituent of a natural gum, sugars such as mannitol, a water soluble polymer such as polyvinyl alcohol or polyvinylpyrrolidone or a proteinaceous material such as powdered egg whites, casein, milk solids, gelatin and zein or any mixture thereof. The term natural gum as used herein in the description and claims is intended to include natural gums as such and gum constituents thereof. Exemplary of cellulose esters are a lower alkyl cellulose, such as, for example, methy or ethyl cellulose; carboxy lower alkyl cellulose, such as, for example, carboxymethylcellulose, a hydroxy lower alkyl cellulose, such as, for example, hydroxymethylcellulose or hydroxyethylcellulose; cellulose esters formed with organic acids, such as, for example, ammonium cellulose acetate phthalate, cellulose acetate butyrate, cellulose acetate sodium phthalate and cellulose acetate potassium phthalate; and an alkali metal salt of a cellulose ester formed with an inorganic acid, such as, for example, sodium cellulose sulfate and potassium cellulose sulfate.

Exemplary of natural gums and gum constituents thereof are acacia, tragacanth, guar gum, karaya, sodium alginate, agar, chondrus, arabic acid, bassorin, carrageenin and pectin.

Preferably, the above noted coating materials will also act as emulsifying agents. However, if the specific coating material does not possess inherent emulsifying properties it can be mixed with other emulsifying coating materials or with well known emulsifying agents such as sorbitan fatty acid esters and polyoxyethylene sorbitan fatty acid esters.

The spray drying is carried out in an apparatus which is conventionally used for spray drying and is well known to the art. The spray drying conditions may vary within wide ranges. It is, however, preferred to use a minimum inlet temperature of about 100° C. and a maximum outlet temperature of about 150° C. Correspondingly the inlet temperature will be higher than the outlet temperature and advantageously will be as high as the limitations will permit. Desirably during the course of operation the inlet and outlet temperatures remain substantially constant. The dried silicone is collected in a receiver at the bottom of the main chamber.

The dry organopolysiloxane compositions of the thus outlined process are comprised of substantially spherical dry powders of uniform particle size comprising the organopolysiloxane substantially completely coated with one of the above mentioned coating materials. The particle size of the organopolysiloxane powder is from about 5 to about 1000 microns and preferably from about 20 to about 100 microns. The organopolysiloxane in the finished powder is from about 5% to about 85% and preferably from about 20% to about 50% by weight of the finished solids.

The finished organopolysiloxane powder formed from the above invention can now be evenly dispersed and conveniently handled for its many applications.

In a preferred embodiment the above spray dried silicone powder is tableted. If necessary, any inert filler, binder or lubricant employed in the tableting art may be mixed with the silicone powder before tableting. Conventional inert fillers, such as for example, terra alba, corn starch, lactose or other like therapeutically inert substances may be used. When a lubricant is advantageously employed it may be magnesium stearate, talc, stearic acid, sodium benzoate or mixtures thereof. If binders are necessary to insure adequate cohesiveness natural gums and gum constituents, as for example, acacia, tragacanth, agar and pectin may be employed. Further, exemplary of binders would be, for example, cellulose esters, polyvinylpyrrolidone and proteinaceous material such as for example, gelatin, casein and zein.

It will be evident to one skilled in the art that the filler, binder and lubricant are standard pharmaceutical tools used commonly in granulating methods and are not an essential aspect of this invention, therefore they can be varied broadly.

It is also evident that the above formed powdered silicone can also be combined with any medicament in the preparation of pharmaceutical dosage forms such as a tablet. By way of example, the medicament may be an antispasmodic or anticholinergic agent, such as, for example, isopropaminde, a sympathomimetic agent, such as, for example amphetamine or dextroamphetamine sulfate, an antihistamine, such as, for example, chloropropheripyridamine maleate, a barbiturate, such as, for example, phenobarbital, a tranquilizer, such as, for example, chlorpromazine and an antibiotic, such as, for example, procaine penicillin.

Most advantageously this invention is applicable to a tablet comprising the combination of an antacid and the novel spray dried silicone powder which is employed for the treatment of gastrointestinal disturbances and like disorders. The antacid employed may be any conventional gastric antacids well known to the art, such as, for example, magnesium hydroxide, aluminum oxyhydroxide, magnesium carbonate, calcium carbonate, magnesium oxide, dihydroxy aluminum aminoacetate, aluminum phosphate, bismuth subcarbonate, potassium phosphate, sodium carboxymethylcellulose and magnesium trisilicate or combinations thereof.

Preferably the antacid will be present in the dosage unit form from about 0.1 gm. to 1.0 gm. and the spray dried silicone from about 10 mg. to about 1000 mg. or the ratio of the powdered silicone to the antacid is from about 1% to about 100%.

The invention will be further clarified by the following specific examples. These examples are not limiting but are used to make obvious to one skilled in the art the full practice of the method of this invention.

EXAMPLE 1

| Ingredients: | Amounts, gms. |
|---|---|
| Methylcellulose, U.S.P. 15 cps. | 5 |
| Milk solids, nonfat dry | 45 |
| Dimethylpolysiloxane | 50 |
| Purified water, U.S.P. | 180 |

The methylcellulose is dispersed in the dimethylpolysiloxane. The milk solids are dissolved in water and the dispersion is added to the reconstituted milk and agitated to form an emulsion. The mixture is then homogenized to complete emulsification. This emulsion is then spray dried in a conventional spray dryer using an inlet temperature of 265° C. and an outlet temperature of at least 120° C. The product is then collected as a dry powder.

EXAMPLE 2

Antacid layer

| Ingredients: | Amounts, mg./tablet |
|---|---|
| Magnesium aluminum oxyhydroxide | 500 |
| Glycine | 50 |
| Mannitol | 350 |
| Methylcellulose | 24 |
| Saccharin sodium, U.S.P. | 3 |
| Polyvinylpyrrolidone (5% in alcohol) | 18 |
| Magnesium stearate | 14 |
| Cornstarch | 12 |
| Flavor, q.s. | |

Silicone layer

| | |
|---|---|
| Spray dried silicone powder (product of Example 1) | 50 |
| Mannitol, N.F. | 100 |
| Glycine | 50 |
| Polyvinylpyrrolidone | 5 |
| Saccharin sodium | 1 |
| Magnesium stearate | 12 |
| Cornstarch | 4 |
| Flavor, q.s. | |

Separate antacid and silicone granulations are prepared by screening and mixing the magnesium aluminum hydroxide and powdered silicone with the glycine, mannitol and methylcellulose. The mixtures are then separately granulated with the polyvinylpyrrolidone solution. The granulations are then dried, screened and mixed with the flavor, magnesium stearate and cornstarch.

The granulations are compressed into a layered tablet by using a multi-layer rotating tablet press. Either a two or three layered tablet may be formed.

Alternatively the antacid and silicone granulations may be intimately mixed and tableted.

EXAMPLE 3

Antacid granulation

| Ingredients: | Amounts, mg./tablet |
| --- | --- |
| Magnesium hydroxide | 125 |
| Aluminum hydroxide, dried gel | 200 |
| Glycine | 50 |
| Mannitol | 350 |
| Methylcellulose | 24 |
| Saccharin sodium, U.S.P. | 3 |
| Polyvinylpyrrolidone (5% in alcohol) | 18 |
| Magnesium stearate | 14 |
| Cornstarch | 12 |
| Flavor, q.s. | |

Silicone core

| Ingredients: | Amounts |
| --- | --- |
| Spray dried silicone powder (product of Example 1) | 75 |
| Mannitol, N.F. | 100 |
| Glycine | 50 |
| Polyvinylpyrrolidone | 5 |
| Saccharin sodium | 1 |
| Magnesium stearate | 12 |
| Cornstarch | 4 |
| Flavor, q.s. | |

The powdered silicone granulation is made as set forth in Example 2 and compressed into tablets.

The antacid granulation is also prepared as outlined in Example 2 and the dry granular material is compressed evenly around the above silicone tablet core using suitable mechanical means, for example, the conventional rotary press coating tablet machine.

EXAMPLE 4

| Ingredients: | Amounts, gms. |
| --- | --- |
| Methylcellulose, U.S.P. 15 cps. | 5 |
| Milk solids, nonfat dry | 20 |
| Dimethylpolysiloxane | 75 |
| Purified water, U.S.P. | 150 |

The methylcellulose is dispersed in the dimethylpolysiloxane. The milk solids are dissolved in water and the dispersion is added to the reconstituted milk and agitated to form an emulsion. The mixture is then homogenized to complete emulsification. This emulsion is then spray dried in a conventional spray dryer using an inlet temperature of 265° C. and an outlet temperature of at least 120° C. The product is then collected as a dry powder.

EXAMPLE 5

| Ingredients: | Amounts, gms. |
| --- | --- |
| Carboxymethylcellulose | 5 |
| Dimethylpolysiloxane | 50 |
| Calcium caseinate | 45 |
| Purified water, U.S.P. | 250 |

The carboxymethylcellulose is dispersed in the dimethylpolysiloxane and the calcium caseinate is dissolved in water and mixed with the dispersion. The mixture is then homogenized to complete emulsification. This emulsion is then spray dried in a conventional spray dryer using an inlet temperature of 265° C. and an outlet temperature of at least 120° C. The product is then collected as a dry powder.

EXAMPLE 6

| Ingredients: | Amounts, gms. |
| --- | --- |
| Polyvinyl alcohol | 15 |
| Dimethylpolysiloxane | 85 |
| Purified water, U.S.P. | 250 |

The polyvinyl alcohol is dissolved in water with the aid of heat and the dimethylpolysiloxane is added. This mixture is then homogenized to complete emulsification. This emulsion is then spray dried in a conventional spray dryer using an inlet temperature of 265° C. and an outlet temperature of at least 120° C. The product is then collected as a dry powder.

EXAMPLE 7

| Ingredients: | Amounts, gms. |
| --- | --- |
| Methylcellulose, U.S.P. 15 cps. | 5 |
| Polyvinylpyrrolidone | 45 |
| Dimethylpolysiloxane | 50 |
| Purified water, U.S.P. | 150 |

The methylcellulose is dispersed in the dimethylpolysiloxane and the polyvinylpyrrolidone is dissolved in water and mixed with the dispersion. The mixture is then homogenized to complete emulsification. This emulsion is then spray dried in a conventional spray dryer using an inlet temperature of 265° C. and an outlet temperature of at least 120° C. The product is then collected as a dry powder.

EXAMPLE 8

| Ingredients: | Amounts, gms. |
| --- | --- |
| Polyvinyl alcohol | 5 |
| Dimethylpolysiloxane | 40 |
| Soybean meal | 55 |
| Purified water, U.S.P. | 450 |

The polyvinyl alcohol is dissolved in water with the aid of heat and dimethylpolysiloxane is added to this and emulsified. The soybean meal is added and cooked until the meal becomes hydrated and a smooth suspension results. This suspension is then homogenized to complete emulsification. This emulsion is then spray dried in a conventional spray dryer using an inlet temperature of 265° C. and an outlet temperature of at least 120° C. The product is then collected as a dry powder.

EXAMPLE 9

| Ingredients: | Amounts, gms. |
| --- | --- |
| Methylcellulose, U.S.P. 15 cps. | 5 |
| Milk solids, nonfat dry | 45 |
| Phenylmethylpolysiloxane | 50 |
| Purified water, U.S.P. | 180 |

The methylcellulose is dispersed in the phenylmethylpolysiloxane. The milk solids are dissolved in water and the dispersion is added to the reconstituted milk and agitated to form emulsification. The mixture is then homogenized to complete emulsification. This emulsion is then spray dried in the conventional spray dryer using an inlet temperature of 265° C. and an outlet temperature of at least 120° C. The product is then collected as a dry powder.

EXAMPLE 10

| Ingredients: | Amounts, gms. |
| --- | --- |
| Acacia | 40 |
| Sorbitan monolaurate | 2 |
| Polyoxyethylene sorbitan monolaurate | 8 |
| Dimethylpolysiloxane | 50 |
| Purified water, U.S.P. | 400 |

The sorbitan monolaurate and polyoxyethylene sorbitan monolaurate are mixed with the dimethylpolysiloxane. The acacia is dissolved in the water and added to the oil phase. The mixture is then homogenized and spray dried.

EXAMPLE 11

| Ingredients: | Amounts, mg. |
|---|---|
| Spray dried silicone powder (product of Example 10) | 100 |
| Glycine | 100 |
| Mannitol, N.F. | 100 |
| Polyvinylpyrrolidone | 5 |
| Saccharin sodium | 1 |
| Magnesium stearate | 12 |
| Cornstarch | 4 |
| Flavor, q.s. | |

The silicone powder, glycine, mannitol and methylcellulose are mixed and granulated with the polyvinylpyrrolidone solution. The granulation is dried, screened and mixed with the flavor, magnesium stearate and cornstarch. The dried granules are then compressed into a tablet.

What is claimed is:

1. A spray dried coated organopolysiloxane oral pharmaceutical or veterinary composition comprising substantially spherical powdered particles having a size of from about 5 microns to about 1000 microns said spray dried organopolysiloxane consisting of an organoploysiloxane substantially completely coated by spray drying an aqueous homogenous emulsion of an organopolysiloxane admixed with from about 15% to about 95% of a nontoxic emulsifiable coating material selected from the group consisting of acacia, guar gum, calcium caseinate, sodium caseinate, ammonium caseinate, milk solids, polyvinyl alcohol, polyvinylpyrrolidone, mannitol, methylcellulose, carboxymethylcellulose, ethyl cellulose, hydroxymethycellulose, hydroxyethylcellulose, ammonium cellulose acetate phthalate, cellulose acetate butyrate, cellulose acetate sodium phthalate, cellulose acetate potassium phthalate, sodium cellulose sulfate, potassium cellulose sulfate, powdered egg whites, casein, gelatin, zein, tragacanth, karaya, sodium alginate, agar, chondrus, arabic acid, bassorin, carrageeinin, pectin, and mixtures thereof, said organopolysiloxane being from about 5% to about 85% by weight of the particles.

2. The spray dried coated organopolysiloxane composition of claim 1 wherein the organopolysiloxane is a dimethypolysiloxane.

3. The powdered organopolysiloxane composition of claim 1 wherein the coating material is milk solids.

4. A compressed tablet for oral pharmaceutical or veterinary use for the treatment of gastrointestinal disturbances containing a spray dried coated organopolysiloxane composition comprising substantially spherical powdered particles having a size of from about 5 microns to about 1000 microns said spray dried organopolysiloxane consisting of an organopolysiloxane substantially completely coated by spray drying an aqueous homogenous emulsion of an organopolysiloxane admixed with from about 15% to about 95% of a nontoxic emulsifiable coating material selected from the group consisting of acacia, guar gum, calcium caseinate, sodium caseinate, ammonium caseinate, milk solids, polyvinyl alcohol, polyvinylpyrrolidone, mannitol, methylcellulose, carboxymethylcellulose, ethyl cellulose, hydroxymethylcellulose, hydroxyethylcellulose, ammonium cellulose acetate phthalate, cellulose acetate butyrate, cellulose acetate sodium phthalate, cellulose acetate potassium phthalate, sodium cellulose sulfate, potassium cellulose sulfate, powdered egg whites, casein, gelatin, zein, tragacanth, karaya, sodium alginate, agar, chondrus, arabic acid, bassorin, carrageenin, pectin, and mixtures thereof, said organopolysiloxane being from about 5% to about 85% by weight of the particles dispersed throughout an inert filler.

5. A compressed tablet for oral pharmaceutical or veterinary use for the treatment of gastrointestinal disturbances containing a medicament effective for gastrointestinal distrubances and a spray dried coated organopolysiloxane composition comprising substantially spherical powdered particles having a size of from about 5 microns to about 1000 microns said spray dried organopolysiloxane consisting of an organopolysiloxane substantially completely coated by spray drying an aqueous homogenous emulsion of an organopolysiloxane admixed with from about 15% to about 95% of a nontoxic emulsifiable coating material selected from the groups consisting of acacia, guar gum, calcium caseinate, sodium caseinate, ammonium caseinate, milk solids, polyvinyl alcohol, polyvinylpyrrolidone, mannitol, methylcellulose, carboxymethylcellulose, ethyl cellulose, hydroxymethylcellulose, hydroxyethylcellulose, ammonium cellulose acetate phthalate, cellulose acetate butyrate, cellulose acetate sodium phthalate, cellulose acetate potassium phthalate, sodium cellulose sulfate, potassium cellulose sulfate, powdered egg whites, casein, gelatin, zein, tragacanth, karaya, sodium alginate, agar, chondrus, arabic acid, bassorin, carrageenin, pectin, and mixtures thereof, said organopolysiloxane being from about 5% to about 85% by weight of the particles.

6. The tablet of claim 5 in which the tablet is a double or triple layer tablet of which at least one layer contains an antacid and at least one layer contains the organopolysiloxane powder.

7. The compressed tablet of claim 5 wherein the medicament is an antacid.

8. The tablet of claim 4 in which a solid emulsifying agent is present.

9. The tablet of claim 8 in which the coating material of the organopolysiloxane powder is an emulsifying agent.

10. The tablet of claim 9 in which the inert filler contains glycine or mannitol.

References Cited

UNITED STATES PATENTS

| | | | |
|---|---|---|---|
| 2,512,192 | 6/1950 | Yen et al. | 167—82 |
| 2,635,981 | 4/1953 | Austin et al. | 167—53 |
| 2,805,977 | 9/1957 | Robinson et al. | 167—82 |
| 2,819,970 | 1/1958 | Steigmann | 99—130 |
| 2,875,130 | 2/1959 | Grass et al. | 167—82 |
| 2,926,121 | 2/1960 | Hobbs et al. | 167—82 |
| 2,934,472 | 4/1960 | May | 167—55 |
| Re. 25,205 | 7/1962 | Feinstone | 167—55 |
| 3,062,711 | 11/1962 | Ratcliff et al. | 167—53 |
| 3,079,303 | 2/1963 | Raff et al. | 167—82 |
| 3,094,464 | 6/1963 | Joullie et al. | 167—82 |

LEWIS GOTTS, *Primary Examiner.*

S. K. ROSE, *Assistant Examiner.*